US008881859B2

(12) United States Patent
Nakamura (10) Patent No.: US 8,881,859 B2
(45) Date of Patent: Nov. 11, 2014

(54) AIR GUIDING STRUCTURE FOR MOTORCYCLES (71) Applicant: Kawasaki Jukogyo Kabushiki Kaisha, Hyogo (JP)

(72) Inventor: Kozo Nakamura, Akashi (JP)

(73) Assignee: Kawasaki Jukogyo Kabushiki Kaisha, Hyogo (JP)

( * ) Notice: Subject to any disclaimer, the term of this patent is extended or adjusted under 35 U.S.C. 154(b) by 0 days.

(21) Appl. No.: 13/644,457

(22) Filed: Oct. 4, 2012

(65) Prior Publication Data
US 2013/0081896 A1 Apr. 4, 2013

(30) Foreign Application Priority Data
Oct. 4, 2011 (JP) .................. 2011-219849

(51) Int. Cl.
B62K 11/00 (2006.01)
B62J 17/02 (2006.01)

(52) U.S. Cl.
CPC ....................... B62J 17/02 (2013.01)
USPC ......... 180/229; 180/68.1; 180/68.3; 180/68.4

(58) Field of Classification Search
CPC .................................. B60K 3/02; B60K 13/06
USPC ....................... 180/68.1, 68.3, 68.4
See application file for complete search history.

(56) References Cited

U.S. PATENT DOCUMENTS 5,012,883 A * 5/1991 Hiramatsu ..................... 180/225
5,383,530 A * 1/1995 Shiohara ....................... 180/227
5,577,570 A * 11/1996 Shiohara et al. .............. 180/219
7,370,902 B2 * 5/2008 Seki et al. ..................... 296/78.1
7,380,624 B2 * 6/2008 Momosaki .................... 180/68.3
7,399,029 B2 * 7/2008 Takeshita ................. 296/203.01
7,448,461 B2 * 11/2008 Misaki et al. ................. 180/68.4
7,850,221 B2 * 12/2010 Nakata et al. ................ 296/78.1
2005/0098142 A1 * 5/2005 Nakagome et al. ....... 123/198 E (Continued)

FOREIGN PATENT DOCUMENTS

EP 1 515 037 3/2005
JP 07-156848 6/1995
JP 2002-284074 10/2002

OTHER PUBLICATIONS

European Patent Application No. 12187010.9 Extended European Search Report dated Sep. 25, 2013, 4 pages.

(Continued)

Primary Examiner — Joseph M Rocca
Assistant Examiner — Conan Duda (57) ABSTRACT

An air guiding structure introduces a cooling air to be supplied to a radiator, positioned forwardly of a combustion engine, and an engine intake air from a single opening in a fairing. The fairing encloses at least an area forwardly of a head pipe and an area laterally outwardly of the radiator. A portion of an inner peripheral face of the opening is formed by an inner cowl. An intake air inlet for introducing the engine intake air is disposed above the radiator. The inner cowl is extended rearwardly to form a cowl extension confronting at least a lower portion of the head pipe and a lower bracket of a front fork assembly from outside. A side wall of the inner cowl including the cowl extension is formed with a guide for guiding an incoming air towards the intake air inlet.

18 Claims, 8 Drawing Sheets

(56) References Cited

U.S. PATENT DOCUMENTS

| | | | |
|---|---|---|---|
| 2009/0108629 A1* | 4/2009 | Takahashi et al. | 296/192 |
| 2009/0108630 A1* | 4/2009 | Nakao et al. | 296/192 |
| 2009/0166121 A1* | 7/2009 | Hiramatsu et al. | 180/291 |
| 2011/0180345 A1* | 7/2011 | Iida et al. | 180/309 |
| 2011/0232982 A1* | 9/2011 | Abe et al. | 180/68.3 |
| 2011/0232983 A1* | 9/2011 | Abe et al. | 180/68.3 |

OTHER PUBLICATIONS

Chinese Patent Application No. 201210366025.4 Office Action dated Feb. 25, 2014, 7 pages with partial English translation.

* cited by examiner

AIR GUIDING STRUCTURE FOR MOTORCYCLES

CROSS REFERENCE TO THE RELATED APPLICATION

This application is based on and claims Convention priority to Japanese patent application No. 2011-219849, filed Oct. 4, 2011, the entire disclosure of which is herein incorporated by reference as a part of this application.

BACKGROUND OF THE INVENTION

1. Field of the Invention

The present invention relates to an air guiding structure for use in a motorcycle for introducing a cooling air to be supplied across the radiator, which is positioned forwardly of a combustion engine, and an engine intake air, which is to be supplied towards the combustion engine, through an opening defined in a fairing mounted on a front portion of a vehicle body structure.

2. Description of Related Art

In the motorcycle of a type having a large scaled fairing, which is called a full cowl, mounted on a front portion of a motorcycle body structure, a disclosure is made in that the cooling of the radiator, positioned forwardly of the combustion engine, with the incoming wind guided through an inner cowl of the fairing is achieved and, also, the incoming wind is introduced with an inlet opening, i.e., an exposed opening defined in the fairing so as to open towards a forward direction of the motorcycle, to thereby increase the efficiency of charging of the intake air towards the combustion engine. In this respect, see the JP Laid-open Patent Publication No. 2002-284074.

It has, however, been found that the disclosure in the above mentioned JP Laid-open Patent Publication No. 2002-284074 makes use of a plurality of openings including an opening, through which the incoming air is introduced across the radiator, and the inlet opening and, therefore, structurally simplified and streamlined aesthetic features in the appearance of the fairing tends to be impaired. Also, if the inlet opening is undersized to highlight the appearance of the fairing, it tends to become difficult to introduce a sufficient amount of intake air into the combustion engine.

SUMMARY OF THE INVENTION

In view of the foregoing, the present invention has been devised to substantially eliminate the above discussed problems and inconveniences inherent in the prior art air guiding structure and is intended to provide an improved air guiding structure for the motorcycle, in which the opening in the fairing is undersized to highlight the appearance of such a fairing and, at the same time, the engine intake air can be smoothly introduced.

In order to accomplish the foregoing object, an air guiding structure for a motorcycle of the present invention may include a radiator positioned forwardly of a combustion engine, and a fairing mounted on a front portion of a motorcycle frame structure and having a single opening to introduce a cooling air to be supplied to the radiator and an engine intake air. The fairing may enclose at least an area forwardly of a head pipe and an area laterally outwardly of the radiator, and include an inner cowl forming at least a portion of an inner peripheral face of the opening. An air intake port may be disposed above the radiator for introducing the engine intake air therein. The inner cowl may be extended rearwardly to form a cowl extension that confronts at least a lower portion of the head pipe and a lower bracket of a front fork assembly from outside. A side wall of the inner cowl including the cowl extension may be formed with a guide for guiding an incoming air towards the air intake port.

According to the above described construction, since the fairing is provided with the single opening and introduces both of the cooling air to be supplied across the radiator and the engine intake air through this single opening, the appearance of the motorcycle is improved with the engine intake air inlet exposed to the outside. Also, since a portion of the incoming wind guided to the opening is introduced through the guide, formed in the cowl extension of the inner cowl, in a rearward direction to the air intake port, the intake air to be supplied towards the combustion engine can be smoothly drawn in with the intake air resistance having been suppressed. As a result that the external air is guided to the intake air inlet in the way as hereinabove described, the intake air temperature during the travel of the motorcycle is lowered and, hence, the external air charging efficiency can be increased. In addition, since the inner cowl is merely extended rearwardly to form the guide, the structure as well is thus simplified.

In the present invention, the guide preferably has a bulged portion that is bulged gradually laterally outwardly in a rearward direction. According to this construction, with the opening undersized sufficiently, the appearance of the motorcycle can be further improved.

In the present invention, a main frame forming a front half of the motorcycle frame structure preferably includes a pair of upper and lower frame pieces, in which case the air intake port is disposed at a location intermediate between the upper and lower frame pieces. According to this construction, since the formation of the intake air inlet at a location intermediate between the two frame pieces of the main frame makes it possible to utilize the space between the upper and lower frame pieces effectively while a unique appearance with the two frame pieces employed is presented. Also, thanks to the guide, the intake air can be smoothly introduced into the intake air inlet that is positioned at a high level above the two frame pieces.

In the present invention, the air intake port is preferably formed by a frame covering disposed between the upper and lower frame pieces for enclosing a gap delimited between those upper and lower frame pieces. According to this construction, since the space between the frame pieces is enclosed by the frame covering, a pleasant look can be available even in the case of a naked type motorcycle with no fairing mounted.

Where the intake air port is formed by the frame covering, the air intake port formed by the frame covering is preferably defined by a plurality of slits. According to this construction, it is possible to avoid an undesirable ingress of foreign matters into the air intake port.

In the present invention, the cowl extension of the inner cowl preferably has a rear edge inclined, when viewed from side, so as to extend along a front surface of the radiator. According to this construction, since the guide can be formed sufficiently to the rear, the incoming wind can be smoothly guided towards the air intake port.

In the present invention, the inner cowl is preferably provided with a light shielding piece for preventing light, leaking from a turn indicator mounted on the fairing, from reaching a rider. According to this construction, by preventing the light, leaking from the turn indicator during the travel of the motorcycle, from reaching the rider, the unpleasant feeling the rider may have can be avoided.

Any combination of at least two constructions, disclosed in the appended claims and/or the specification and/or the accompanying drawings should be construed as included within the scope of the present invention. In particular, any combination of two or more of the appended claims should be equally construed as included within the scope of the present invention.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DESCRIPTION OF PREFERRED EMBODIMENTS

Hereinafter, a preferred embodiment of the present invention will be described in detail with reference to the accompanying drawings.

Figure 1:
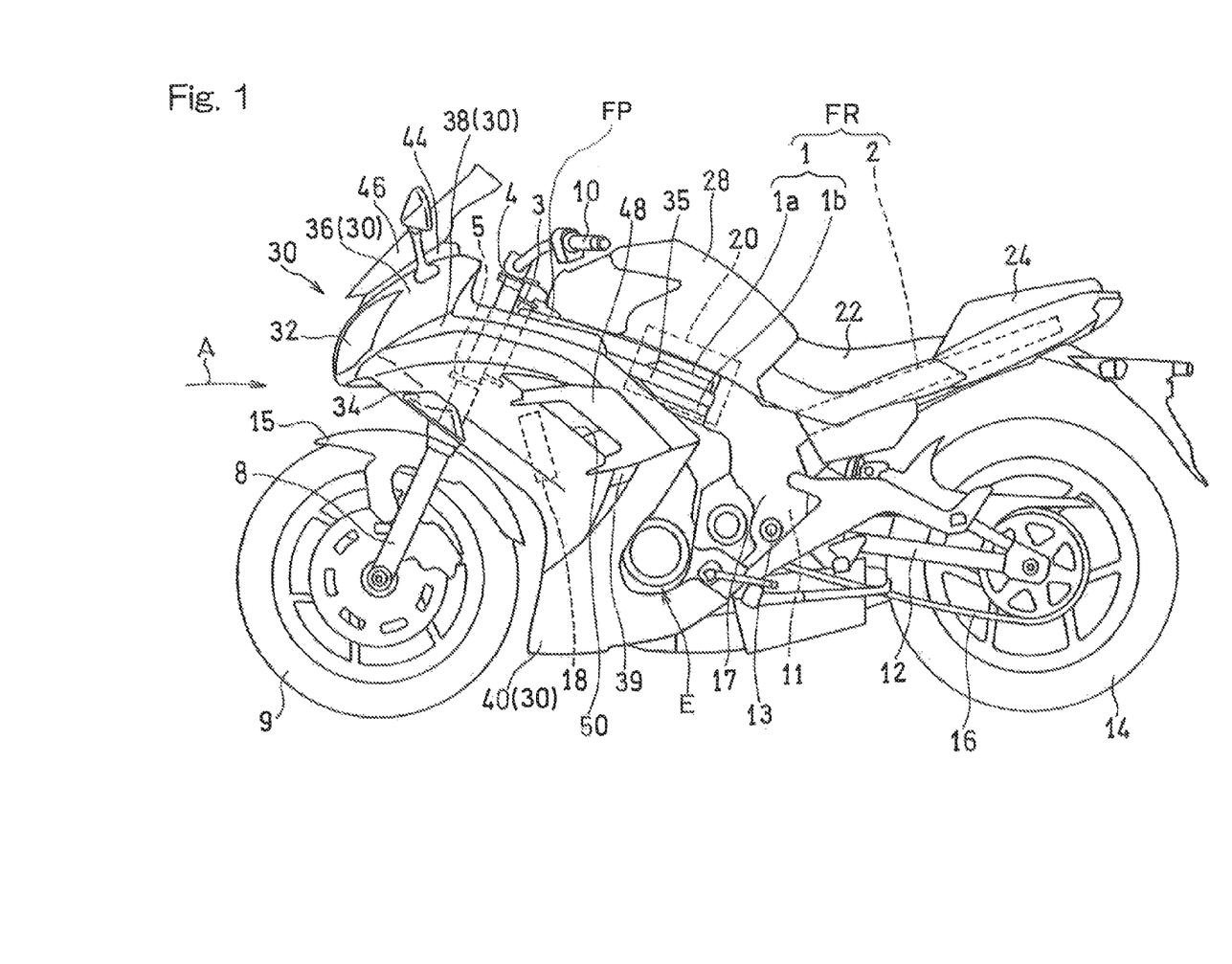
FIG. 1 is a side view showing a motorcycle equipped with an air guiding structure designed in accordance with a preferred embodiment of the present invention.

A motorcycle to which the present invention is applicable is shown in FIG. 1. The illustrated motorcycle includes a motorcycle frame structure FR made up of a main frame 1, forming a front half of the motorcycle frame structure FR, and a rear frame 2 connected with a rear portion of the main frame 1 and forming a rear half of the motorcycle frame structure FR. The main frame 1 has a head pipe 3 fitted to a front end portion thereof, and an upper bracket 4 and a lower bracket 5 are fitted to the head pipe 3 through a steering shaft (not shown) rotatably inserted in such head pipe 3, with a front fork assembly 8 supported by the upper bracket 4 and the lower bracket 5. A motorcycle front wheel 9 is rotatably supported at a lower end portion of the front fork assembly 8, and a front fender 15 is mounted above the front wheel 9. A handlebar 10 is mounted on the upper bracket 4 at an upper end portion of the front fork assembly 8.

The main frame 1 has a rear end lower portion provided with a swingarm bracket 11, and a swingarm 12 is supported by the swingarm bracket 11 through a pivot pin 13, inserted in a front end portion of the swingarm 12, for movement up and down about the pivot shaft 13. This swingarm 12 has a rear end portion having a motorcycle rear wheel 14 supported rotatably thereby. In the instance as shown, the swingarm bracket 11 is concealed by a pivot covering 17 from the outside. A parallel multicylinder combustion engine E is mounted on an intermediate lower portion of the main frame 1 and is drivingly connected with the rear wheel 14 by means of a power transmitting mechanism 16 such as, for example, an endless chain for driving the rear wheel 14. A radiator 18 for cooling an engine cooling water with the incoming wind A is disposed forwardly of the combustion engine E.

A rider's seat 22 and a fellow passenger's seat 24 are supported by the rear frame 2. A fuel tank 28 is mounted on an upper portion of the main frame 1 at a location generally intermediate between the handlebar 10 and the rider's seat 22. An air cleaner unit 20 for substantially purifying the incoming air A introduced as an engine intake air I to be supplied to the combustion engine E is disposed above the combustion engine E and below the fuel tank 28. Also, a large scaled fairing 30, which is referred to as a full cowl and which is made of a resinous material, is mounted on a front portion FP of the motorcycle frame structure FR so as to enclose a front region ranging an area forwardly of the handlebar 10 to opposite lateral areas of the front portion FP of the motorcycle frame structure FR, and a headlamp unit 32 and left and right turn indicators, generally identified by 34, are mounted on this fairing 30, noting that the terms "left" and "right" referred to above and hereinafter are to be understood as used in relation to the position of a motorcycle rider occupying the rider's seat 22 unless otherwise specified.

The fairing 30 is made up of an upper cowl for enclosing an area forwardly of the head pipe 3 with respect to the forward travel of the motorcycle, left and right side cowls 38 each extending from a lower edge of the upper cowl 36 in a direction rearwardly downwardly of the motorcycle frame structure FR so as to enclose an area laterally upwardly thereof, and left and right lower cowls 40 extending from a lower edge of the corresponding side cowl 38 in a direction downwardly therefrom so as to enclose an area laterally downwardly of the motorcycle frame structure FR, more specifically, so as to enclose an area laterally of the combustion engine E and a portion of an exhaust pipe.

The upper cowl 36 has a front portion on which the headlamp unit 32 referred to above is mounted. A meter covering 44 for covering an area forwardly of an instrument unit (not shown) including a speedometer, a tachometer and other gauges is mounted on an upper portion of the upper cowl 36, and a windshield 46 is fitted above this meter covering 44.

Each of the left and right side cowls 38 encloses an area laterally of the radiator 18 and a cylinder block 39 of the combustion engine E, with the corresponding left or right turn indicator 34 mounted on a front portion of the respective side cowl 38. A wind discharging opening 50 is formed in part in each of the side cowls 38 and in part in the associated lower cowl 40, and this wind discharging opening 50 is reinforced with a reinforcement member 48 of a generally U-shaped configuration opening in a forward direction with respect to the direction of forward travel of the motorcycle. This reinforcement member 48 is of one piece product made of a resinous material.

Figure 2:
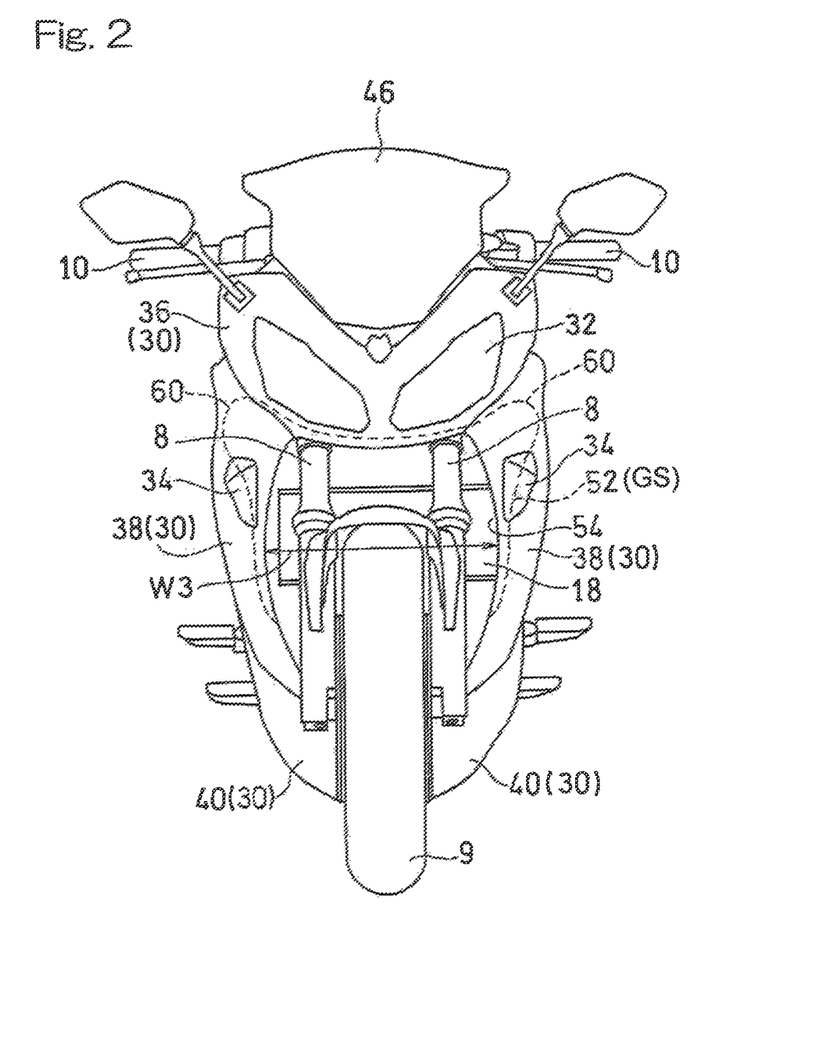
FIG. 2 is a front elevational view showing the motorcycle shown in FIG. 1.
Figure 3:
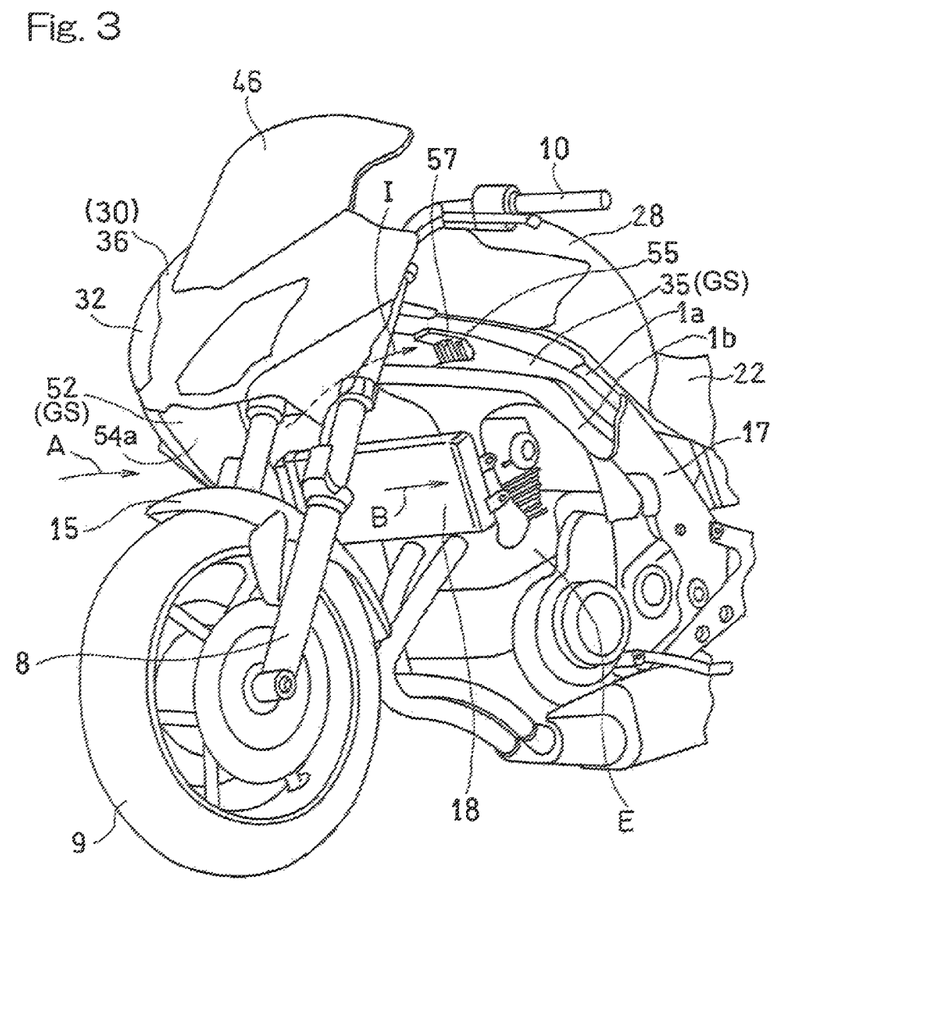
FIG. 3 is a perspective view showing a front portion of the motorcycle shown in FIG. 1.
Figure 4:
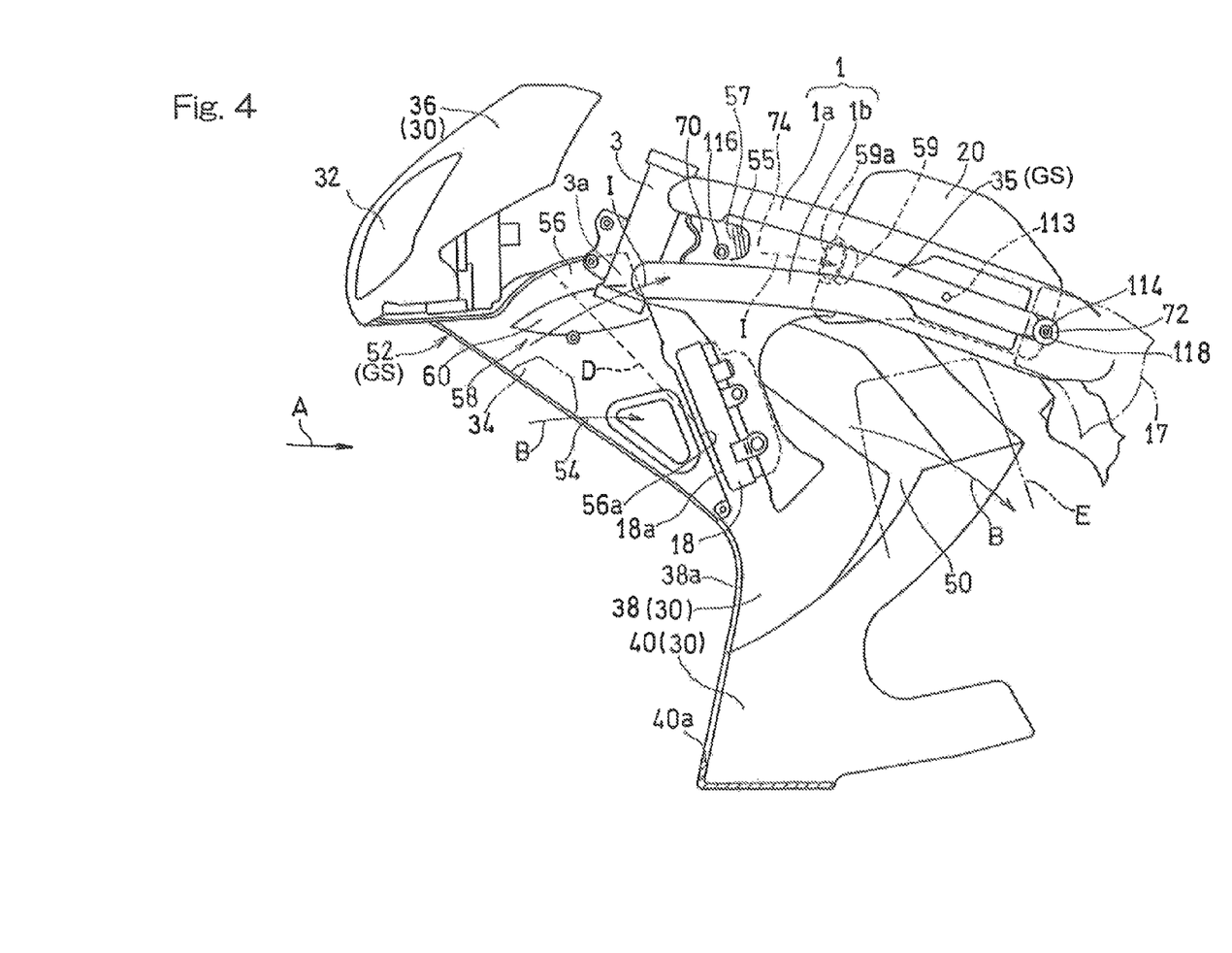
FIG. 4 is a side view showing, on a somewhat enlarged scale, the front portion of the motorcycle shown in FIG. 1.

As shown in FIG. 2, a single opening 54 is formed inside the fairing 30 and a portion of the incoming wind A introduced into this opening 54 forms a cooling air to be supplied across the radiator 18 and an engine intake air. More specifically, the opening 54 referred to above is delimited by a front end lower edge portion of the upper cowl 36, respective front edge portions of the opposite side cowls 38 and 38, and respective front edge portions of the opposite lower cowls 40 and 40. In a region below the upper cowl 36 and inwardly of the opposite side cowls 38 and 38, left and right inner cowls 52 and 52 (only the right inner cowl 52 being shown in FIG. 3) are disposed as shown in FIG. 3. In other words, as best shown in FIG. 4, the opening 54 has its inner peripheral face 54a; an upper portion of such inner peripheral face 54a of the opening 54 and an upper half of such inner peripheral face 54 of the opening 54 on each side of such upper portion thereof are delimited by the corresponding left or right inner cowl 52, whereas a lower portion of such inner peripheral face 54a and a lower half of each of side portions of the inner peripheral face 54a of the opening 54 and are delimited by end faces 38a and 40a of an inner periphery of the left or right side cowl 38 and the associated lower cowl 40.

Figure 6:
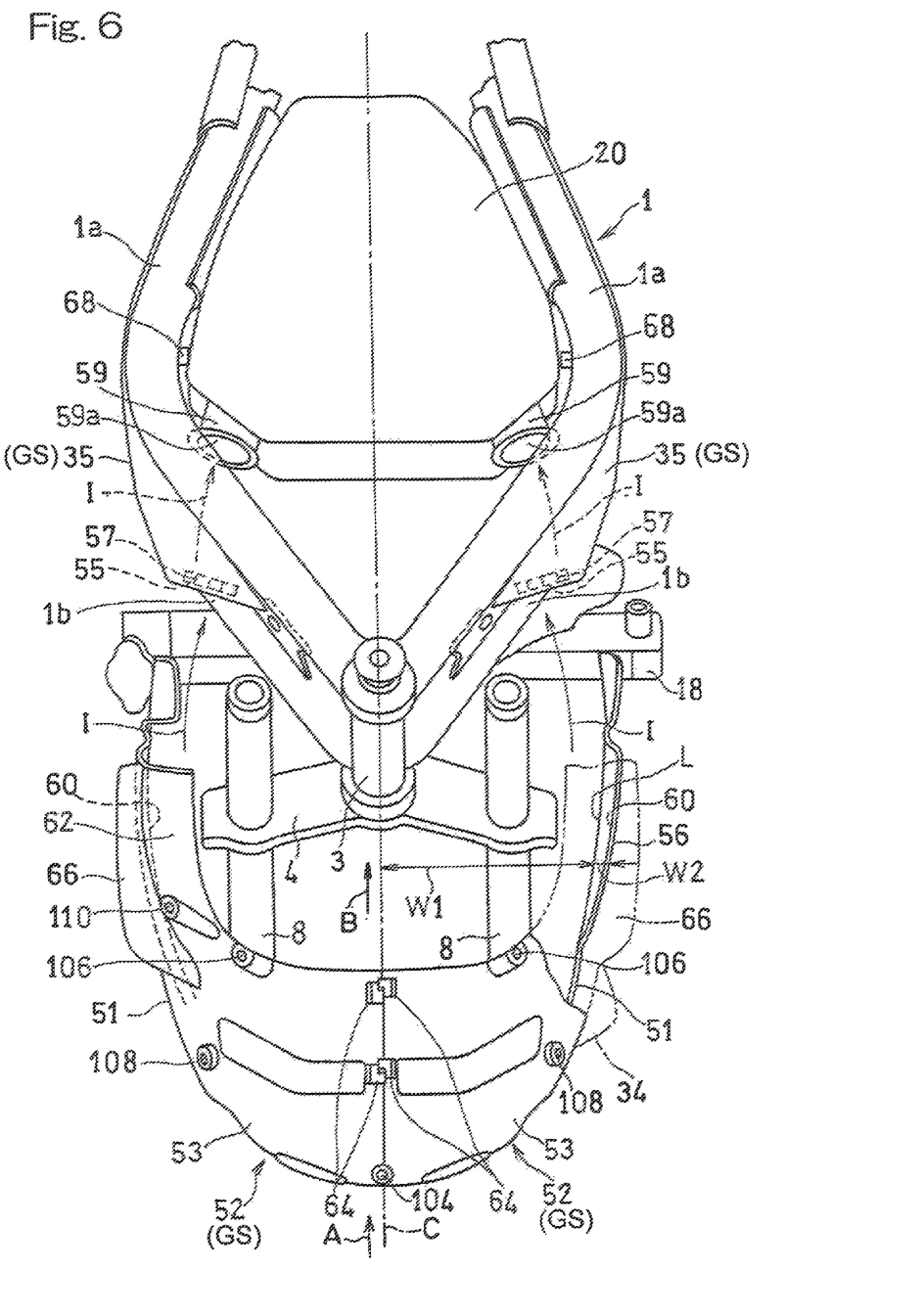
FIG. 6 is a top plan view showing the front portion of the motorcycle shown in FIG. 1.

Referring to FIG. 6, the main frame 1 is made up of left and right pairs of upper and lower frame pieces 1a and 1b, which are employed in the form of an upper and a lower tubes and which extend in a direction longitudinally of the motorcycle, although in FIG. 3 only the left pair of the upper and lower frame pieces 1a and 1b appearing on the left side of the motorcycle frame structure FR is shown representatively. As shown particularly in FIG. 3, a frame covering 35, employed for each side of the motorcycle frame structure FR and made of a resinous material, is disposed intermediate between the upper and lower frame pieces 1a and 1b for enclosing a gap delimited between those frame pieces 1a and 1b, and an intake air inlet 55 for the admission of the engine intake air therethrough is formed in that frame covering 35. This intake air inlet 55 is defined in a front portion of the frame covering 35 and positioned inwardly of the side cowl 38 and upwardly rearwardly of the radiator 18. The intake air inlet 55 in the frame covering 35 is defined by a plurality of slits 57 and, in other words, the slits 57 collectively cooperate with each other to define the intake air inlet 55. It has however to be noted that the intake air inlet 55 may not be necessarily comprised of those slits 57, but it may be a single opening.

As shown in a perspective views of the left and right inner cowls 52 as viewed from rear with respect to the direction of forward travel of the motorcycle, each of the left and right inner cowls 52 is made up of a main body 51, which corresponds in function to the conventionally used inner cowl, and a cowl extension 56 newly added in accordance with teachings of the present invention so as to extend rearwardly from a rear portion of the main body. The boundary between the main body 51 and the cowl extension 56 in each of the left and right inner cowls 52 is shown by the broken line D in FIG. 5. The main body 51 in each of the left and right inner cowls 52 has its upper portion, a front half of which is formed with a top wall 53 that extends substantially or generally horizontally in a direction in which it merges with a top wall 53 of the other of the left and right inner cowls 52.

Figure 5:
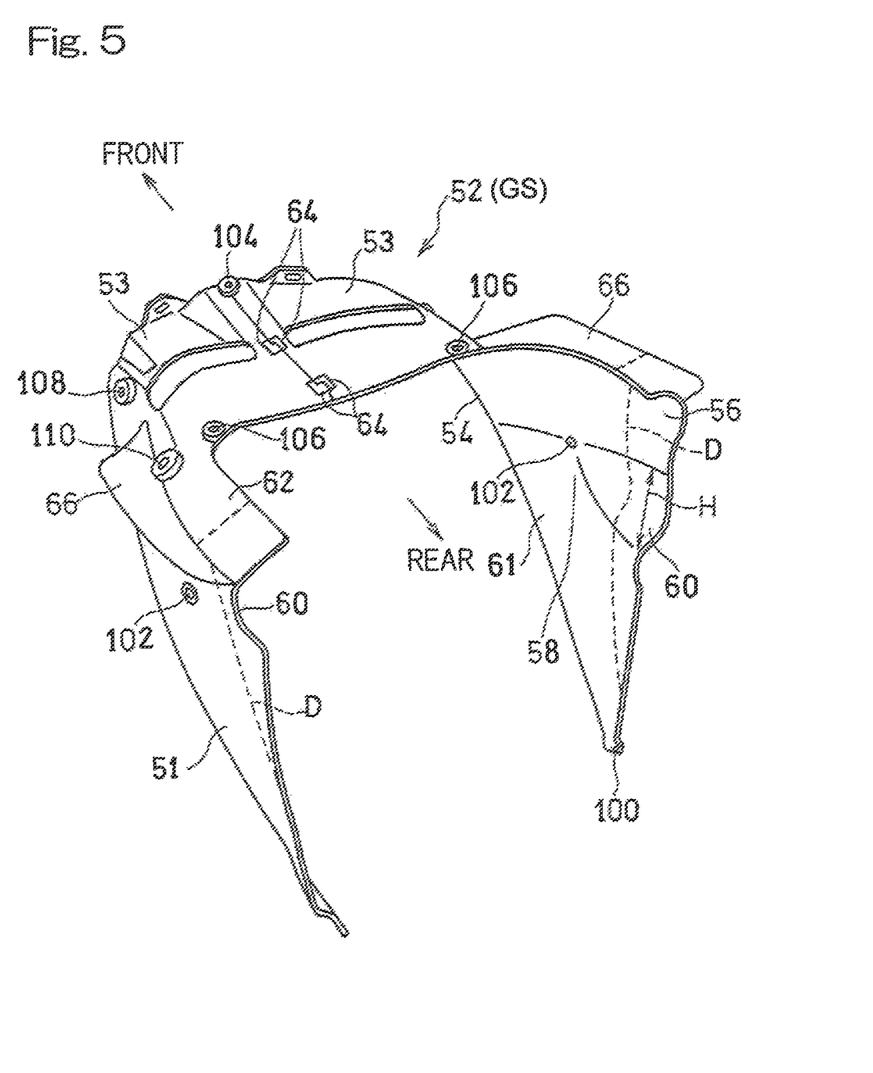
FIG. 5 is a perspective view showing, as viewed from rear, an inner cowl employed in the motorcycle.

Each of the left and right inner cowls 52 also has a side wall 61, which, when viewed from side, represents a generally triangular shape having one of its apexes defining an acute angled lower end of the main body 51 of the corresponding inner cowl 52, and an inner surface of the respective side wall 61 cooperates with an inner surface of the associated top wall 53 to guide the flow of the cooling air B then flowing towards the radiator 18 and the combustion engine E. Also, each of the left and right inner cowls 52 has first and second throughholes 100 and 102; the first throughhole 100 is defined in the lower end of the main body 51 and the second throughhole 102 is defined in the respective main body 51 at a location somewhat above a center portion of such main body 51. A top portion of each of the left and right inner cowls 52 has a rear half provided with a light shielding piece 66 spreading laterally outwardly therefrom so as to lie generally horizontally. Each of the left and right inner cowls 52 in its entirety is formed of one piece construction by the use of a mold technique.

As best shown in FIG. 4, the cowl extension 56 of each of the inner cowls 52 extends to a position laterally inwardly confronting a lower portion 3a of the head pipe 3 and the lower bracket 5 of the front fork assembly 8 so as to define a guide 58 for guiding the incoming wind A towards the intake air inlet 55 in a region ranging from the respective main body 51 to the adjacent cowl extension 56. The cowl extension 56 of each of the inner cowls 52 has a rear edge 56a, which, when viewed from side, extends somewhat forwardly of a front surface 18a of the radiator 18 and is inclined forwards so as to assume a substantially or generally horizontal relation to such front surface 18a. The guide 58 referred to above has, as shown in FIG. 5, a bulged portion 60 defined in a region ranging from a longitudinal intermediate portion of the side wall 61 to a rear end edge thereof so as to bulge gradually in a direction laterally outwardly of the corresponding left or right inner cowl main body toward a rear portion. As FIG. 4 makes it clear, this bulged portion 60 in each of the left and right inner cowls 52 is positioned forwardly below the intake air inlet 55.

As shown in a plan view in FIG. 6, the bulged portion 60 has an inner surface of a bulged width W2, which is within the range of 0.05 to 0.12W1 and preferably within the range of 0.06 to 0.10W1 relative to the one-half widthwise dimension W1 as measured from a motorcycle center line C to a lower edge L of the bulged portion 60, that is, a line of extension L, along which line L the main body 51 of each of the left and right inner cowls 52 is extended rearwardly. In the illustrated embodiment now under discussion, however, the bulged width W2 is chosen to be 0.08W1. The vertical dimension H of the bulged portion 60 shown in FIG. 5 gradually increases in a region from a front end portion thereof towards an intermediate portion and is substantially constant in a region from the intermediate portion to a rear end portion thereof. The maximum value of the vertical dimension H is chosen to be within the range of 0.10 to 0.30W1 and preferably within the range of 0.15 to 0.25W1 relative to the previously described one-half widthwise dimension W1. In the illustrated embodiment now under discussion, however, the vertical dimension H is chosen to be 0.20W1.

Referring now to FIG. 6, the top wall 53 of each of the inner cowls 52 has an inner edge formed integrally with a pair of front and rear engagement pieces 64 and 64, which are used to engage the left and right top walls (headlamp fixtures) 53 and 53 with each other, by means of a molding technique. The inner edge of each of the headlamp fixtures 53 has a front portion formed with a third throughhole 104 extending vertically completely across the wall thereof. Also, a fourth throughhole 106 opening upwards in a direction slantwise outwardly is formed in an outer side area of a rear end portion of each of the top walls 53. Yet, fifth throughholes 108 opening upwardly in a direction slantwise outwardly are formed in opposite outer side edge portions of the respective headlamp fixture 53 and, more specifically, in a portion continued to the main body 51 of each of the inner cowls 52.

The light shielding piece 66 employed in each of the left and right inner cowls 52 as hereinabove described is used to prevent a light, leaking from the adjacent left or right turn indicator 34, from reaching the rider, then occupying the rider's seat 22, through a gap between the corresponding inner cowl 52 and the associated side cowl 38. The light shielding piece 66 is formed in the respective inner cowl 52 so as to project outwardly of an outer surface of the bulged portion 60. At a location somewhat upwardly of each of the light shielding piece 66, an inwardly extending extension 62 is formed integrally with the inner cowl 52. An electric wiring cable of the left or right headlamp unit 32 (FIG. 3) is wired in this inward extension 62 and a cable support member (not shown) such as, for example, a cramp is fitted to a sixth throughhole 110, defined in a front portion of the inward extension 62, to thereby fix the cable in position.

Figure 7:
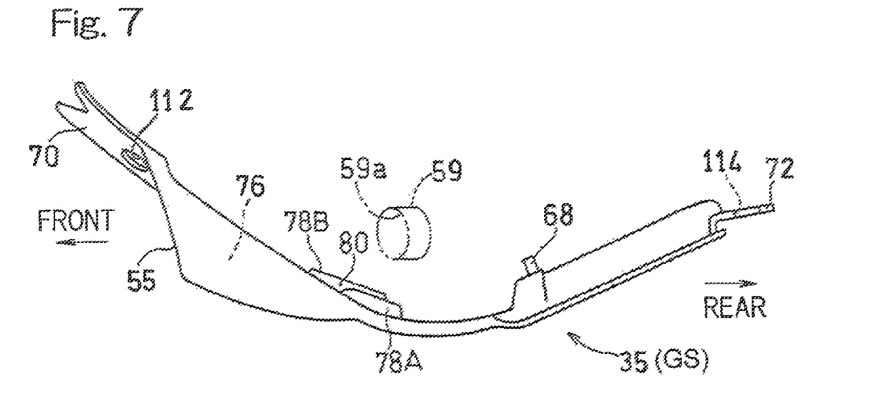
FIG. 7 is a top plan view showing a frame covering employed in the motorcycle shown in FIG. 1.

The frame covering 35, which is employed for each side of the motorcycle and which is a molded product of a resinous material, has a shape following the associated upper and lower frame pieces 1a and 1b of the main frame 1 and, as shown in FIG. 7, represents, when viewed from top, a substantially or generally bow shaped configuration having its longitudinal intermediate portion bulged laterally outwardly of the motorcycle frame structure FR. The intake air inlet 55, best shown in a side view in FIG. 8 and formed in a front end portion of the respective frame covering 35, is held in position to confront longitudinally an inlet 59a of an air intake duct 59 communicated with the air cleaner unit 20 shown in FIG. 6.

Figure 8:
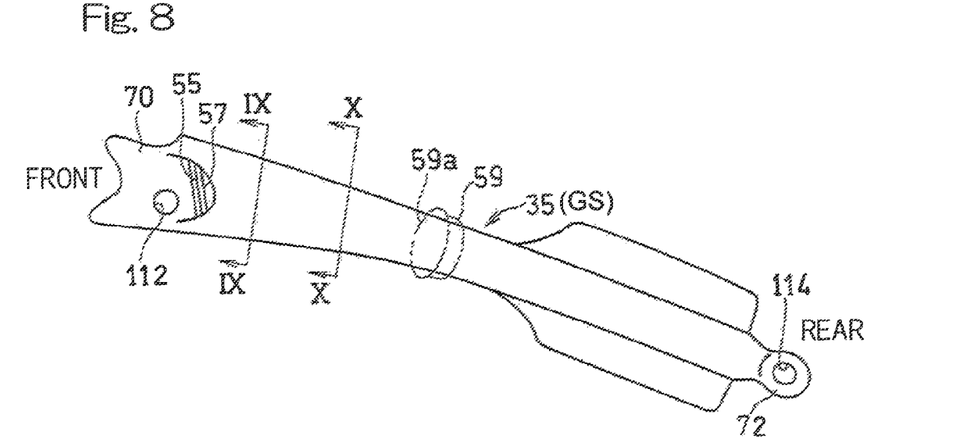
FIG. 8 is a side view showing the frame covering shown in FIG. 7.

A longitudinal intermediate portion of each of the frame coverings 35 has an engagement projection 68 formed in an inner surface thereof so as to protrude inwardly of the motorcycle frame structure FR as shown in FIG. 7. As shown in FIG. 8, the respective frame covering 35 has a front end formed with a forwardly extending front support 70, with a bolt insertion hole 112 defined in such front support 70 so as to be oriented in a direction widthwise of the motorcycle. The respective frame covering 35 also has a rear end formed with a rearwardly extending rear support 72, with a covering throughhole 114 defined in such rear support 72 so as to be oriented in a direction widthwise of the motorcycle.

Figure 9:
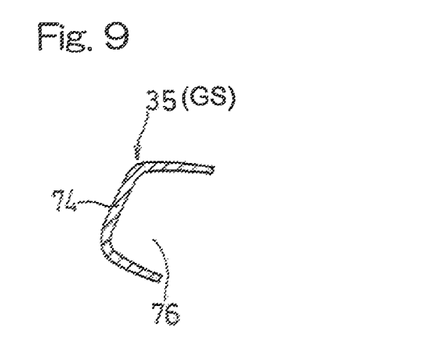
FIG. 9 is a cross sectional view taken along the line IX-IX in FIG. 8.
Figure 10:
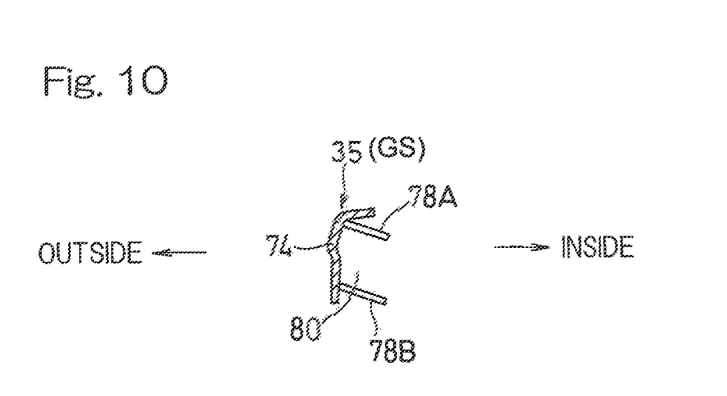
FIG. 10 is a cross sectional view taken along the line X-X in FIG. 8.

As shown in a cross sectional view in FIG. 9, a rear side of the intake air inlet 55 in each of the frame coverings 35 has an introducing passage 76 defined by a passage defining wall 74 of a substantially or generally U-shaped configuration opening inwardly of the motorcycle frame structure FR, and the engine intake air I referred to previously is introduced towards the combustion engine E through this introducing passage 76. This introducing passage 76 has a rear portion formed, as shown in a cross sectional view in FIG. 10, with an upper guide wall 78A and a lower guide wall 78B both extending from the passage defining wall 74 in a direction inwardly of the motorcycle frame structure FR. The passage defining wall 74 in each of the frame coverings 35 cooperates with the upper and lower guide walls 78A and 78B to define an air guide passage 80 through which the engine intake air I, entering the intake air inlet 55, is introduced into the inlet 59a of the air intake duct 59.

Hereinafter, the manner of fitting each of the frame coverings 35 and the associated inner cowl 52 onto the motorcycle frame structure FR, specifically, the motorcycle frame structure FR will be described in detail.

The engagement projection 68 of the frame covering 35, best shown in FIG. 7, is engaged in an engagement hole 113 defined in the main frame 1, shown in FIG. 4, through an elastic member (not shown) such as, for example, a damper. Subsequently, fastening members 116 such as, for example, bolts are inserted into the bolt insertion hole 112, defined in the front support 70 of the frame covering 35, and an insertion hole (not shown) defined in the main frame 1, respectively, followed by fastening of associated nuts to thereby secure a front portion of the frame covering 35 to the motorcycle frame structure FR.

The rear support 72 of the frame covering 35 is fitted to the main frame 1 by means of the pivot covering 17 for concealing it from the outside. In other words, the covering throughhole 114 in the frame covering 35 is aligned with a substantially ring shaped damper 118, made of a rubber material and fitted to a mounting hole (not shown) in the main frame 1, and an engagement projection (not shown) provided in the pivot covering 17 is subsequently passed through a center hole defined in the damper 118 to allow the frame covering 35 to be urged against the main frame 1 through the damper 118. In this way, the rear portion of the frame covering 35 is secured to the motorcycle frame structure FR while having been sandwiched between the main frame 1 and the pivot covering 17.

The engagement pieces 64 and 64 are engaged with each other with the third throughholes 104 and 104 in the left and right inner cowls 52 and 52 having been overlapped one above the other as shown in FIG. 6 and fastening members such as, for example, rivets are passed from below through the overlapped third throughholes 104 and 104, respectively. Then, by fastening the rivet to associated mounting holes (not shown) defined in the upper cowl 36 shown in FIG. 4, the inner cowl 52 is secured to the upper cowl 36. Also, when a fastening member such as, for example, a rivet is passed from below through the fourth throughhole 106 and is then fastened to a mounting hole (not shown) defined in the headlamp unit 32, the inner cowl 52 is secured to the headlamp unit 32.

When respective fastening members such as, for example, rivets are passed from inside of the motorcycle frame structure FR through the first and second throughholes 100 and 102 in the inner cowls 52 and the fifth throughhole 108 shown in FIG. 6 and are then fastened to associated mounting holes (not shown) defined in the side cowl 38 shown in FIG. 3, the inner cowl 52 is secured to the side cowl 38. In this way, the inner cowl 52 is supported by the motorcycle frame structure FR through the headlamp unit 32, the upper cowl 36 and the side cowl 38.

The details of air guide function of the motorcycle embodying the above described preferred embodiment of the present invention is now described.

During the forward travel of the motorcycle, as shown in FIG. 3, the incoming wind A is introduced into the inside of the fairing 30 by way of the opening 54 after having passed through a space delimited between the front fender 15 and the upper cowl 36. A major portion of the incoming wind A so imported into the inside of the fairing 30 is guided by the inner surface of the inner cowl 52, then supplied as a cooling air B to the radiator 18 and finally discharged to the outside of the fairing 30 through the discharging opening 50 after it has been used to cool the radiator 18.

A portion of the incoming wind A introduced into the inside of the fairing 30 is, after having been guided by the guide 58 of the inner cowl 52 shown in FIG. 4, supplied to the intake air inlet 55 in the frame covering 35 as the engine intake air I and is then supplied from the intake air inlet 55 to the air cleaner unit 20 through the air intake duct 59 by way of the guiding passage 74. The engine intake air I so supplied to the air cleaner unit 20 as hereinabove described is, after having been substantially purified as it flow therethrough, supplied to the combustion engine E.

As hereinabove described, the inner cowls 52 and 52, defining the opening 54 and the guide 58, and the frame covering 35 defining the intake air inlet 55 cooperate with each other to form the air guiding structure GS for the motorcycle.

In the construction hereinabove fully described, since as shown in FIG. 2, the fairing 30 is provided with the single opening 54 and introduces both of the cooling air B to be supplied across the radiator 18 and the engine intake air I through this single opening 54, the appearance of the motorcycle is improved without the engine intake air intake port 55 exposed to the outside. Also, since as shown in FIG. 4, that portion of the incoming wind A guided to the opening 54 is introduced from the guide 58, formed in the cowl extension 56 of the inner cowl 52, in a rearward direction to the intake air inlet 55, the intake air to be supplied towards the combustion engine E can be smoothly drawn in with the intake air resistance having been suppressed. As a result that the external air is guided to the intake air inlet 55 in the way as hereinabove described, the intake air temperature during the travel of the motorcycle is lowered and, hence, the external air charging efficiency can be increased. In addition, since the inner cowl 52 is merely extended rearwardly to form the guide 58, the structure as well is thus simplified.

Since as shown in FIG. 5, the guide 58 has the bulged portion 60 that is bulged gradually outwards in the rearward direction, the appearance of the motorcycle can be further improved particularly when the opening 54 is undersized, i.e., has the widthwise dimension W3 thereof reduced sufficiently.

Since as shown in FIG. 4, the intake air inlet 55 is disposed intermediate between the two frame pieces 1a and 1b of the main frame 1, the space delimited between the frame pieces 1a and 1b can be effectively utilized, while the motorcycle has a unique appearance with the use of the two frame pieces 1a and 1b. In addition, thanks to the guide 58, the intake air can be smoothly introduced into the intake air inlet 55 that is positioned at a high level of the two frame pieces 1a and 1b.

Also, since the intake air inlet 55 is formed by the frame covering 35 then enclosing the gap delimited between the frame pieces 1a and 1b, the gap between the frame pieces 1a and 1b is enclosed by the frame covering 35 and, therefore, a pleasing look can be available even in the case of a naked type motorcycle with no fairing 30 mounted.

Since as shown in FIG. 3, the intake air inlet 55 of the frame covering 35 is formed in the form of the plurality of the slits 57, it is possible to avoid an undesirable ingress of foreign matters into the intake air inlet 55.

Since as shown in FIG. 4, the rear edge 56a of the cowl extension 56 of the inner cowl 52 is, when viewed from side, inclined forwardly along the front surface 18a of the radiator 18, the guide 58 can be formed sufficiently long to the rear thereby to guide the incoming wind A smoothly towards the intake air inlet 55. Since the inner cowl 52 does not cover laterally outwardly of the radiator 18, the incoming wind A having passed the inner cowl 52 flows on both sides of the radiator 18 and is then smoothly discharged to the outside through the discharging opening 50.

Since as shown in FIG. 6, the inner cowl 52 is provided with the light shielding piece 66 for avoiding the light, leaking from the adjacent turn indicator 34, from reaching the rider then occupying the rider's seat 22, it is possible to prevent such a light from reaching the rider during the travel to thereby avoid the rider from feeling unpleasant.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. By way of example, although in describing the foregoing preferred embodiment, the inner cowl 52 has been shown and described as formed in a portion of an inner peripheral face Ma of the opening 54, it may be formed over the entire inner peripheral face.

Accordingly, such changes and modifications are, unless they depart from the scope of the present invention as delivered from the claims annexed hereto, to be construed as included therein.

REFERENCE NUMERALS

1: Main frame
1a, 1b: Frame piece
3: Head pipe
5: Lower bracket
8: Front fork assembly
18: Radiator
30: Fairing
34: Turn indicator
35: Frame covering
52: Inner cowl
54: Opening
55: Intake air inlet (Air intake port)
56: Cowl extension
57: Slit
58: Guide
60: Bulged portion
61: Side wall
66: Light shielding piece
A: Incoming wind
B: Cooling air
E: Combustion engine
FR: Motorcycle frame structure
I: Engine intake air

What is claimed is:

1. An air guiding structure for a motorcycle comprising:
a radiator positioned forwardly of a combustion engine; and
a fairing mounted on a front portion of a motorcycle frame structure and having a single opening to introduce a cooling air to be supplied to the radiator and an engine intake air;
wherein the fairing encloses at least an area forwardly of a head pipe and an area laterally outwardly of the radiator, and includes an inner cowl forming at least a portion of an inner peripheral face of the opening;
wherein an intake air port is disposed on the motorcycle at a position higher than the radiator and offset to the rear of the fairing for introducing the engine intake air therein;
wherein the inner cowl is extended rearwardly to form a cowl extension that extends across at least a front of a lower portion of the head pipe and a front of a lower bracket of a front fork assembly relative to the front portion of the motorcycle, and a side wall of the inner cowl including the cowl extension is formed with a guide for guiding a portion of the cooling air towards the air intake port; and
wherein the intake air port is arranged outside of the front fork assembly with respect to a widthwise direction of the motorcycle for receiving the portion of cooling air after it leaves the side wall guide and the portion of the cooling air passes through an open air gap before entering the intake air port.

2. The air guiding structure for the motorcycle as claimed in claim 1, in which the guide has a bulged portion that is bulged laterally outwardly and gradually in a rearward direction.

3. The air guiding structure for the motorcycle as claimed in claim 1, in which a main frame forming a front half of the motorcycle frame structure includes a pair of upper and lower frame pieces and the intake air port is disposed at a location intermediate between the upper and lower frame pieces.

4. The air guiding structure for the motorcycle as claimed in claim 3, in which the intake air port is formed by a frame covering disposed between the upper and lower frame pieces for enclosing a gap delimited between those upper and lower frame pieces.

5. The air guiding structure for the motorcycle as claimed in claim 4, in which the intake air port formed by the frame covering is defined by a plurality of slits.

6. The air guiding structure for the motorcycle as claimed in claim 1, in which the cowl extension of the inner cowl has a rear edge inclined, when viewed from side, so as to extend along a front surface of the radiator.

7. The air guiding structure for the motorcycle as claimed in claim 1, in which the inner cowl is provided with an integral light shielding piece for preventing light, leaking from a turn indicator mounted on the fairing, from reaching a rider.

8. An air guiding structure for a motorcycle comprising:
a radiator positioned forwardly of a combustion engine; and
a fairing mounted on a front portion of a motorcycle frame structure and having a common opening to introduce a cooling air to be supplied to the radiator and an engine intake air;
wherein the fairing encloses at least an area forwardly of a head pipe and an area laterally outwardly of the radiator, and includes an inner cowl forming at least a portion of an inner peripheral face of the opening;
wherein an intake air port is disposed on the motorcycle at a position higher than the radiator and offset to rear of the fairing for introducing the engine intake air therein; and
wherein the inner cowl has a confronting portion which confronts a lower bracket of a front fork assembly from outside of the motorcycle, and a side wall of the confronting portion of the inner cowl is formed with a guide for guiding a portion of the cooling air towards the intake air port; and
wherein the guide has a bulged portion which bulges gradually in a direction of laterally outwardly of the motorcycle toward a rearward direction of the motorcycle and the portion of cooling air leaves the guide and passes through an open air gap before entering the intake air port.

9. The air guiding structure for the motorcycle as claimed in claim 8, wherein the bulged portion is positioned forwardly of the intake air port.

10. The air guiding structure for the motorcycle as claimed in claim 8, wherein a vertical dimension of the bulged portion gradually increases toward a rearward direction.

11. The air guiding structure for the motorcycle as claimed in claim 8, wherein the motorcycle frame structure comprises left and right pairs of upper and lower frame pieces, a gap between the upper and the associated lower frame pieces being covered by a frame covering, wherein the air intake port is defined in the frame covering.

12. The air guiding structure for the motorcycle as claimed in claim 11, wherein the guide and the air intake port are formed on both sides of the motorcycle.

13. The air guiding structure for the motorcycle as claimed in claim 8, wherein the guide is integrally formed with the inner cowl.

14. An air guiding structure for providing air separately to a radiator and to a combustion engine in a motorcycle comprising:
a pair of inner cowls interconnected together to provide an opening forwardly of a head pipe, with a horizontal top wall and side walls extending across and below the radiator to direct air flow, during movement of the motorcycle, to the radiator and to an exterior of the combustion engine, the pair of inner cowls form a fairing mounted on a front portion of a motorcycle frame structure, wherein an upper rear edge of each of the side walls has an outer curved configuration at a location above the radiator to direct air flow entering the opening upward and pass an exterior outer surface of a front fork assembly for a front wheel of the motorcycle; and
a pair of frame coverings, each frame covering mounted respectively on the motorcycle frame structure to align with the resultant air flow from the outer curved configuration of one of the side walls of an inner cowl, each frame covering having an inlet opening and an extended side wall from the inlet opening to channel air in a longitudinal direction aligned with an inlet air port offset from the corresponding inner cowl for delivering air to the combustion engine, the inlet air port receiving the resultant directed air flow from the upper rear outer curved edge of the inner cowl after the channeled air passes through an open air gap before entering the inlet air port.

15. The air guiding structure of claim 14 wherein the pair of inner cowls are formed as a unitary resin wall configured to direct air.

16. The air guiding structure of claim 14 wherein the pair of frame coverings have a slotted inlet opening and are mounted offset and to the rear of the pair of inner cowls on the motorcycle frame structure.

17. The air guiding structure of claim 16 wherein each of the pair of frame coverings, when viewed from a top perspective view, has a bow shaped configuration with the inlet opening extending outward from the motorcycle frame structure, the pair of frame coverings are formed of plastic.

18. The air guiding structure of claim 14 wherein each of the pair of frame coverings have the intake air port extending outward from the motorcycle frame structure and offset to the rear of the pair of inner cowls to align with and receive the resultant directed air flow from the upper rear outer curved edge of the inner cowl after the air flow passes through the open air gap to the intake air port.

* * * * *